May 6, 1930.  E. A. CONNER  1,756,973

THREADING WIRE STRAND

Filed March 12, 1926

Edward A. Conner, INVENTOR

BY

Frederick S. Duncan, ATTORNEY

Patented May 6, 1930

1,756,973

UNITED STATES PATENT OFFICE

EDWARD A. CONNER, OF STRATFORD, CONNECTICUT, ASSIGNOR TO AMERICAN CHAIN COMPANY, INC., A CORPORATION OF NEW YORK

THREADING WIRE STRANDS

Application filed March 12, 1926. Serial No. 94,354.

This invention relates to wire strands, and is of particular utility when embodied in wire stays or similar tension members for use in aeroplanes and when embodied in cables for snubbers or in brake cables, for use upon automobiles, although the improvements herein disclosed may be used in any field for which they are adapted by their nature, and the expression "strand" is used in an inclusive sense to cover wire ropes and cables formed of several strands.

The primary object of the invention is to provide a strand, composed of several wires twisted or laid together, with a thread formed upon a portion of their periphery by swaging or suitable working to adapt the strand for connection with an attachment member such as a shackle having a socket threaded internally to receive the threaded portion of the strand, these threaded portions respectively being preferably of circular cross-section to permit the shackle and strand to be screwed together.

The various features of the invention are described and claimed in the specification and illustrated in the drawings, in which Figure 1 is a view in elevation of a wire strand in the construction of which the invention has been embodied, with an attachment in place thereon.

Figure 1:
Figure 2:
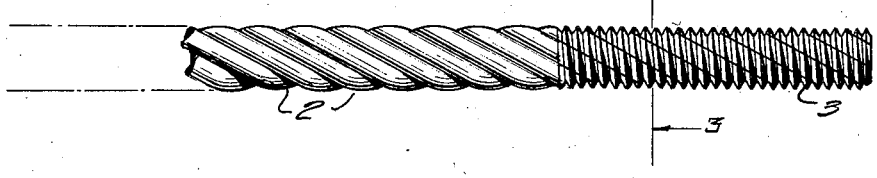
Fig. 2 is a fragmentary detail view in elevation, on an enlarged scale, of a threaded portion of the strand.
Figure 3:
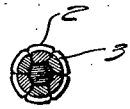
Fig. 3 is a section on the line 3—3 of Fig. 1.

In the illustrated embodiment, the part designated by the reference numeral 1 is a wire strand composed of wires 2, twisted or laid together in helical relation, and preferably constituting what is sometimes described as an inert-lay strand, in which by pre-formation of the strand components helically they are rendered free from the tendency to untwist when the strand is severed.

In pursuance of the invention, the strand is worked by the application thereto of forces acting upon its periphery to form thereon a thread 3 whereby the strand is adapted to receive, and to be screwed into, the threaded socket 4 of an attachment member 5, illustrated as a shackle to be connected with any suitable article with which attachment is to be effected.

The strand is preferably of cylindrical form at the region of the threaded joint, to permit the shackle and strand to be screwed together, but the exact contour of the joint, and the mode of forming the same, are subject to modifications within the spirit of this invention, which relates primarily to the novel thread formation upon the periphery of the component members of a wire strand.

The joint thus constituted avoids the necessity of providing the strand with a sleeve or similar intermediate member adapted to connect the strand with an attachment, and thus reduces the time and cost of labor and material, as well as providing a more compact joint and a more direct connection.

Having described my invention, I claim:

1. In the preparation of wire strand for attachment, the step which comprises working the periphery of the strand to form a thread upon the component wires thereof, said component wires retaining all of the material possessed prior to working.

2. A strand formed of wires laid together and threaded by the process of working the strand components peripherally to form upon said strand a thread to adapt said strand to be united with a correspondingly threaded attachment member, said strand components retaining the complete component material possessed thereby prior to said working.

3. A strand formed of cylindrical wires laid together in helices of relatively long pitch and worked by the process of swedging said strand peripherally to form upon said strand a thread of relatively short pitch, to adapt said strand to be united with a correspondingly threaded attachment member, the threaded portion of the strand being cylindrical in contour, and said strand components retaining the complete component material possessed thereby prior to said working and also retaining their cylindrical contour at regions not worked to form said thread 4. The combination, with a wire strand having a portion of its periphery of cylindrical contour provided with a thread, worked therein by the process of swedging said strand peripherally, of an attachment member having a threaded socket screwed upon said threaded portion of said strand, and said strand components retaining the complete component material possessed thereby prior to said working.

In testimony whereof, I have signed this specification.

EDWARD A. CONNER.